(12) United States Patent
Muller

(10) Patent No.: US 10,706,418 B2
(45) Date of Patent: Jul. 7, 2020

(54) DYNAMIC VALIDATION OF SYSTEM TRANSACTIONS BASED ON MACHINE LEARNING ANALYSIS

(71) Applicant: SAP SE, Walldorf (DE)

(72) Inventor: Andre Muller, Speyer (DE)

(73) Assignee: SAP SE, Walldorf (DE)

( * ) Notice: Subject to any disclaimer, the term of this patent is extended or adjusted under 35 U.S.C. 154(b) by 70 days.

(21) Appl. No.: 15/917,463

(22) Filed: Mar. 9, 2018

(65) Prior Publication Data

US 2019/0279208 A1  Sep. 12, 2019

(51) Int. Cl.
*G06N 99/00* (2019.01)
*G06Q 20/40* (2012.01)
*G06Q 30/06* (2012.01)
*G06Q 40/00* (2012.01)
*G06N 20/00* (2019.01)

(52) U.S. Cl.
CPC ............. *G06Q 20/40* (2013.01); *G06N 20/00* (2019.01); *G06Q 30/0633* (2013.01); *G06Q 40/10* (2013.01)

(58) Field of Classification Search
CPC ............................... G06Q 20/40; G06N 20/00
See application file for complete search history.

(56) References Cited

U.S. PATENT DOCUMENTS

| | | | |
|---|---|---|---|
| 2016/0042466 A1* | 2/2016 | Herndon | G06Q 40/10 705/31 |
| 2018/0357714 A1* | 12/2018 | So | G06Q 40/025 |
| 2019/0057381 A1* | 2/2019 | Fenton | G06Q 20/35785 |

FOREIGN PATENT DOCUMENTS

WO  WO-2017210519 A1 * 12/2017 ............. G06N 5/025

OTHER PUBLICATIONS

Cameron. "Using Correcting Entries for Mistakes in Your Books," Patriot Software (Year: 2017).*
Dhrubajyoti Dey, 2017, Growing Importance of Machine Learning in Compliance and Regulatory Reporting, European Journal of Multidicinplainary Studies.*

* cited by examiner

*Primary Examiner* — Olabode Akintola
*Assistant Examiner* — Brandon M Duck
(74) *Attorney, Agent, or Firm* — Jones Day

(57) ABSTRACT

Systems and methods for applying machine learning to dynamically validate a sales transaction document created by a user in a computing system are provided. Data comprising the sales transaction document is received. A machine learning model is applied to the sales transaction document to verify that the sales transaction document meets at least one compliance standard. The user is alerted if the sales transaction document does not meet the at least one compliance standard. The maching learning model is generated by: receiving first sales transaction data from a database; determining patterns based on the first sales transaction data, wherein the patterns indicate that corrective data was created to compensate for at least one error in original data, the at least one error indicating that the original data did not meet at least one compliance standard; and generating the machine learning model based on the determined patterns.

20 Claims, 7 Drawing Sheets

DYNAMIC VALIDATION OF SYSTEM TRANSACTIONS BASED ON MACHINE LEARNING ANALYSIS

TECHNICAL FIELD

The technology described herein relates generally to machine learning and the application of machine learning to the validation of sales and purchase transaction data.

BACKGROUND

Large companies that provide goods and/or services to their customers typically use computing systems to produce and store a vast amount of sales and purchase transaction data. The sales and purchase transaction data may be subject to internal company standards as well as accounting best practices and standards. In addition, the data may be subject to the review of governmental entities. In Brazil, for example, billing data related to sales and purchase transactions between companies and government entities must be submitted to the government for approval via the internet. Policies in Brazil necessitate government approval for all sales and purchase transactions, regardless of whether the transaction is with a government entity. These submission and approval requirements are being instituted by governments in many countries around the world.

Government entities or third parties who represent government entities receive sales and purchase transaction data in order to verify that companies pay appropriate taxes on transactions. When companies err by not paying the appropriate taxes on sales and purchase transactions, additional corrective transactions that compensate for errors may be created. Compensating for the errors introduces administrative costs and leads to a larger data footprint. In addition, governments may issue penalties for unpaid or incorrectly paid taxes. One such penalty might be that a company is no longer allowed to buy goods or services. Therefore, creating billing data that complies with governmental requirements can save a company time and money and avoid legal penalties.

Ensuring that data complies with laws or governmental standards may be challenging, given the potential complexity of the laws and the need to apply the appropriate laws to the data. This is true especially in countries like Brazil, which has arguably the most complicated tax regulations in the world. Machine learning can be implemented in instances when developing static rules would be too cumbersome and applying the rules to the data could result in either over- or under-inclusiveness. Using a data-driven approach, machine learning can aptly be applied to situations that involve a large amount of data that is subject to many complicated rules, e.g., vast amounts of sales and purchase transaction data that must comply with governmental standards. Algorithms that use machine learning, as opposed to static rules, may provide for more flexibility as standards change or are added.

SUMMARY

Systems and methods are provided for applying machine learning to dynamically validate a sales transaction document created by a user in a computing system. Data comprising the sales transaction document is received. A machine learning model is applied to the sales transaction document to verify that the sales transaction document meets at least one compliance standard. The user is alerted if the sales transaction document does not meet the at least one compliance standard. The maching learning model is generated by: receiving first sales transaction data from a database; determining patterns based on the first sales transaction data, wherein the patterns indicate that corrective data was created to compensate for at least one error in original data, the at least one error indicating that the original data did not meet at least one compliance standard; and generating the machine learning model based on the determined patterns.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter relates to enhanced systems, methods, and computer program products for applying machine learning to dynamically validate sales and purchase transaction data created by a user in a computing system. A machine learning model analyzes previously generated sales and purchase transaction data, "learns" from mistakes that were made in the previously generated data, applies knowledge of those mistakes to a current sales transaction document or a current purchase transaction document, and alerts the user of a probable noncompliance. The dynamic validation algorithm achieves several important goals.

First, the algorithm and a validation system that uses the algorithm may reduce software development costs. Existing compliance standards may not be hard-coded in the algorithm, but instead the algorithm may determine many existing standards based on previously produced data. The algorithm automatically may determine additional standards as new sales and purchase transaction data is produced, analyzed, and incorporated into a machine learning model. Thus, there is no need to hard-code all laws and/or standards in the system, reducing the burden on software developers.

Second, implementing the algorithm reduces costs. The system can warn the user who is creating sales and purchase transaction data of a potential noncompliance ahead of time, e.g., prior to submission to a government entity or third party. This can save a company the time and the cost to correct noncompliant sales and purchase transactions, reduce the data footprint associated with sales and purchase transactions, and avoid auditing by the government entity or penalties issued by the government entity for noncompliance.

Third, the algorithm is more accurate than its counterparts. The algorithm analyzes previously submitted data to determine noncompliance of current data. The appropriate laws or standards have already been applied to the previously submitted data. For example, if sales or purchase transaction data is associated with a particular locality, the sales or purchase transaction data may have been reviewed under laws of that particular locality. Because the algorithm learns from the data and the errors/noncompliances in the data, it is more likely to correctly apply the law to the current sales and purchase transaction data than a system in which static rules are created and applied to the sales and purchase transaction data.

Figure 1:
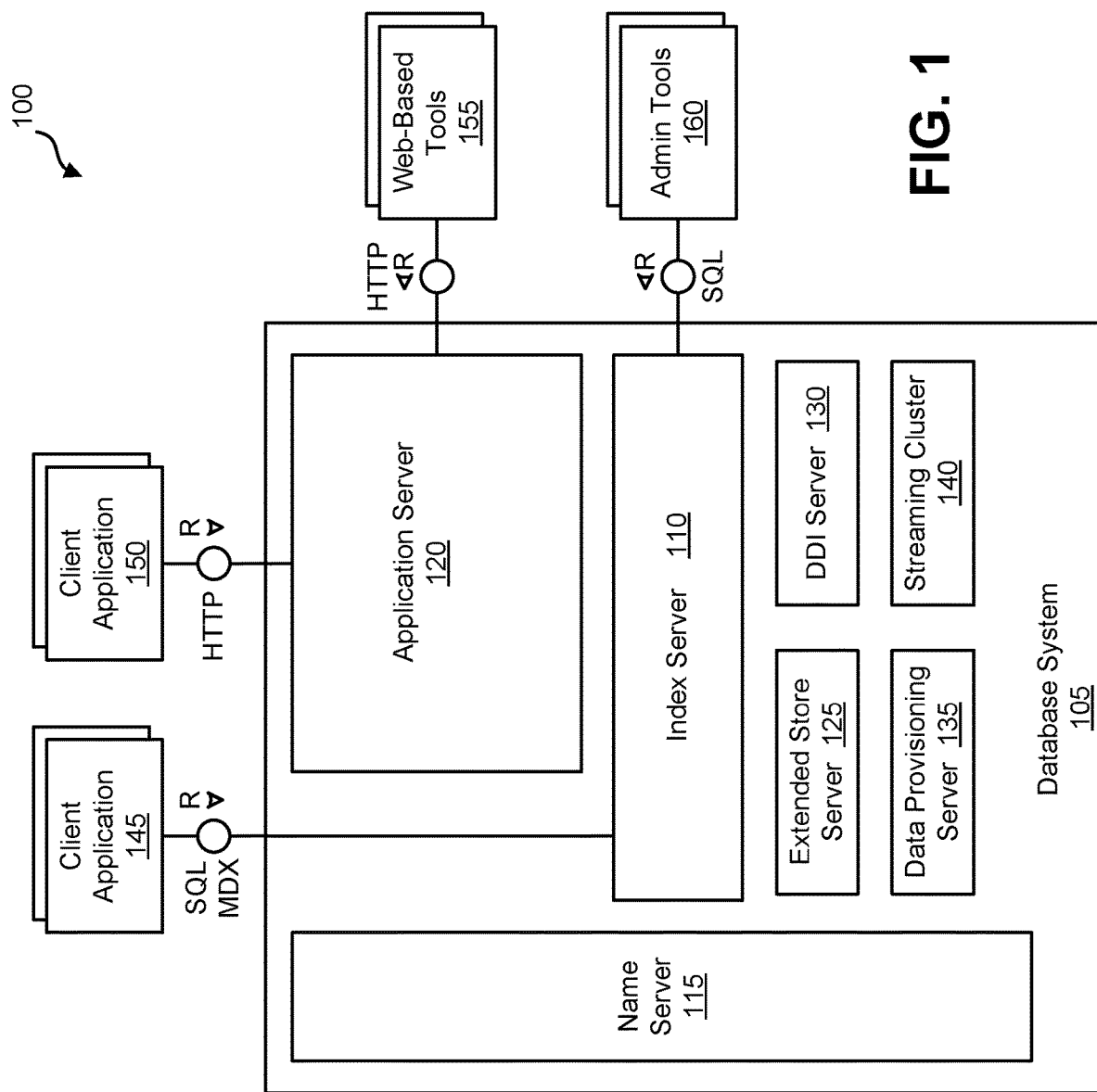
FIG. 1 is a system diagram illustrating an example database system for use in connection with the current subject matter.

FIG. 1 is a diagram 100 illustrating a database system 105 that can be used to implement aspects of the current subject matter. The database system 105 can, for example, be an in-memory database in which all relevant data is kept in main memory so that read operations can be executed without disk I/O and in which disk storage is required to make any changes durables. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also host the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also be used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
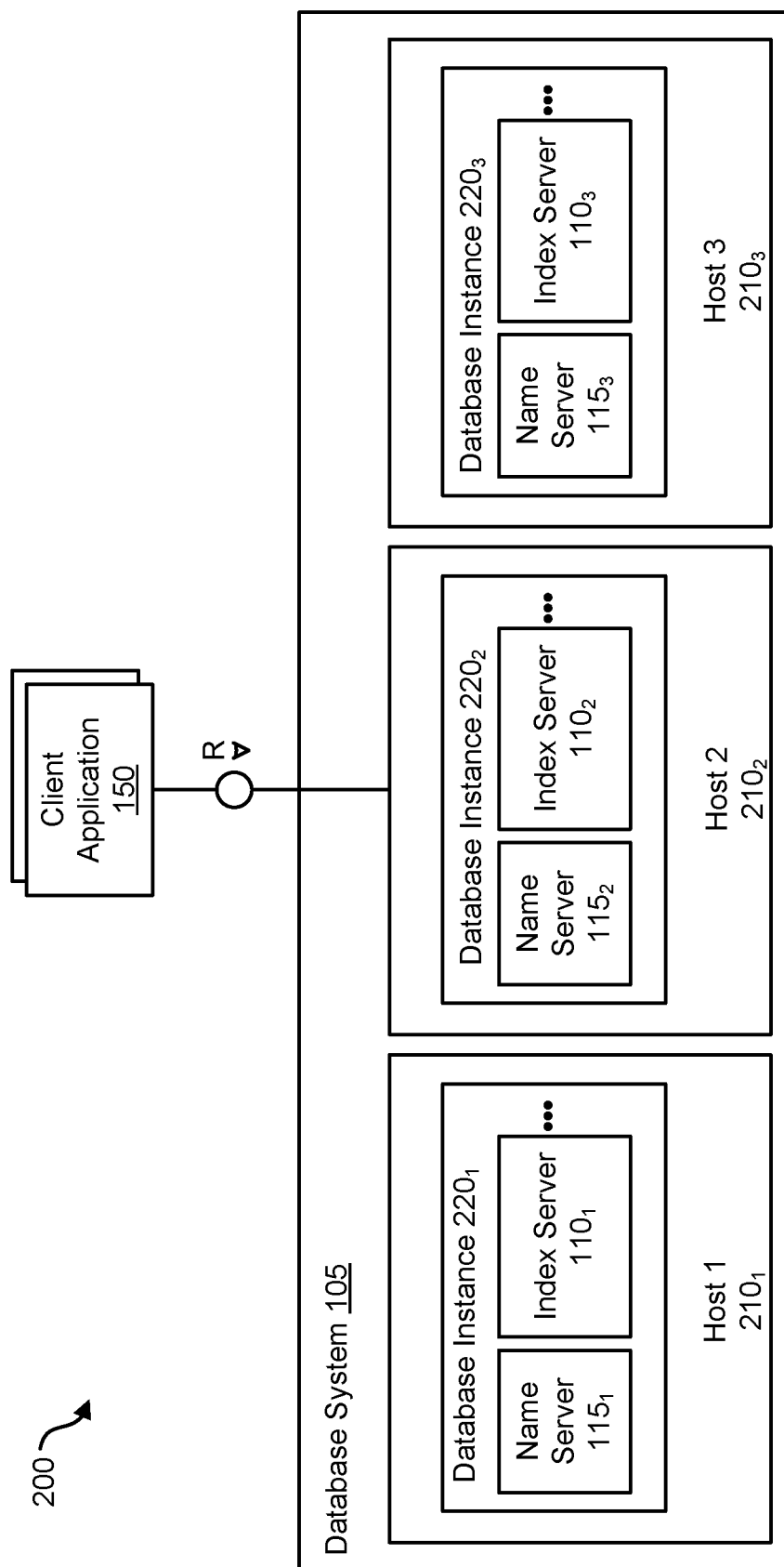
FIG. 2 is a system diagram illustrating a distributed database system having a plurality of database instances.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 230 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host 210₁₋₃ can execute a database instance 220₁₋₃ which comprises the set of components of the distributed database system 105 that are installed on one host 210₁₋₃. FIG. 2 shows a distributed system with three hosts, which each run a name server 110₁₋₃, index server 120₁₋₃, and so on (other components are omitted to simplify the illustration).

Figure 3:
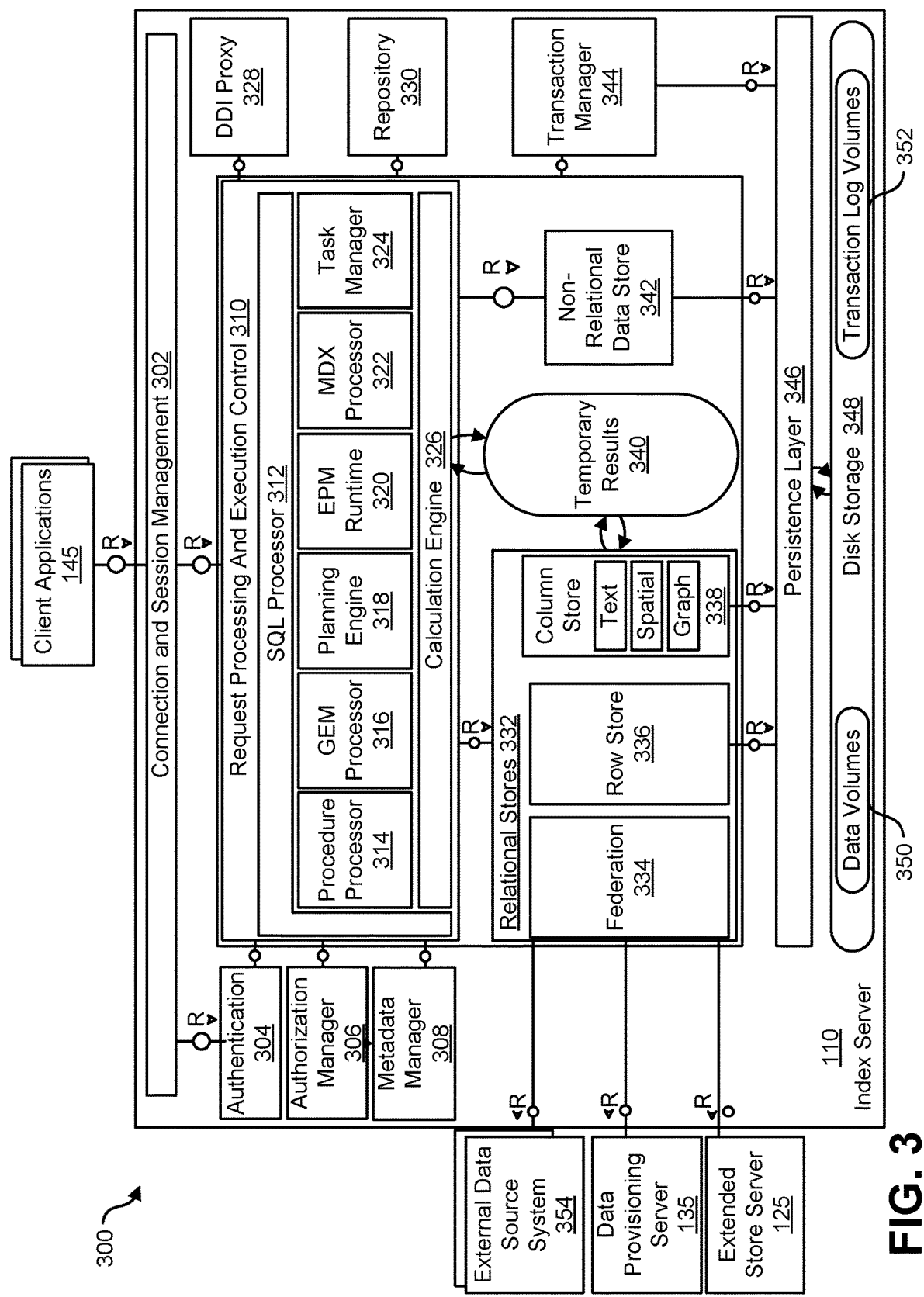
FIG. 3 is a system diagram of an index server forming part of the database system of FIG. 1.

FIG. 3 is a diagram 300 illustrating an architecture for the index server 110 (which can, as indicated above, be one of many instances). A connection and session management component 302 can create and manage sessions and connections for the client applications 145. For each session, a set of parameters can be maintained such as, for example, auto commit settings or the current transaction isolation level.

Requests from the client applications 145 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 145 using the same network communication protocol. GEM statements can be sent using a built-in SQL system procedure.

The index server 110 can include an authentication component 304 that can be invoked with a new connection with a client application 145 is established. Users can be authenticated either by the database system 105 itself (login with user and password) or authentication can be delegated to an external authentication provider. An authorization manager 306 can be invoked by other components of the database system 145 to check whether the user has the required privileges to execute the requested operations.

Each statement can be processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 145 can be received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can be forwarded to a task manager 324 (which can be part of a larger task framework) Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 308. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 308 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can store relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph API.

The row store 336 can store relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extends transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and savepoints. The persistence layer 346 can provide interfaces for writing and reading persisted data and it can also contain a logger component that manages a transaction log. Transaction log entries can be written explicitly by using a log interface or implicitly when using the virtual file abstraction.

The persistence layer 236 stores data in persistent disk storage 348 which, in turn, can include data volumes 350 and/or transaction log volumes 352 that can be organized in pages. Different page sizes can be supported, for example, between 4 k and 16M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

Figure 4:
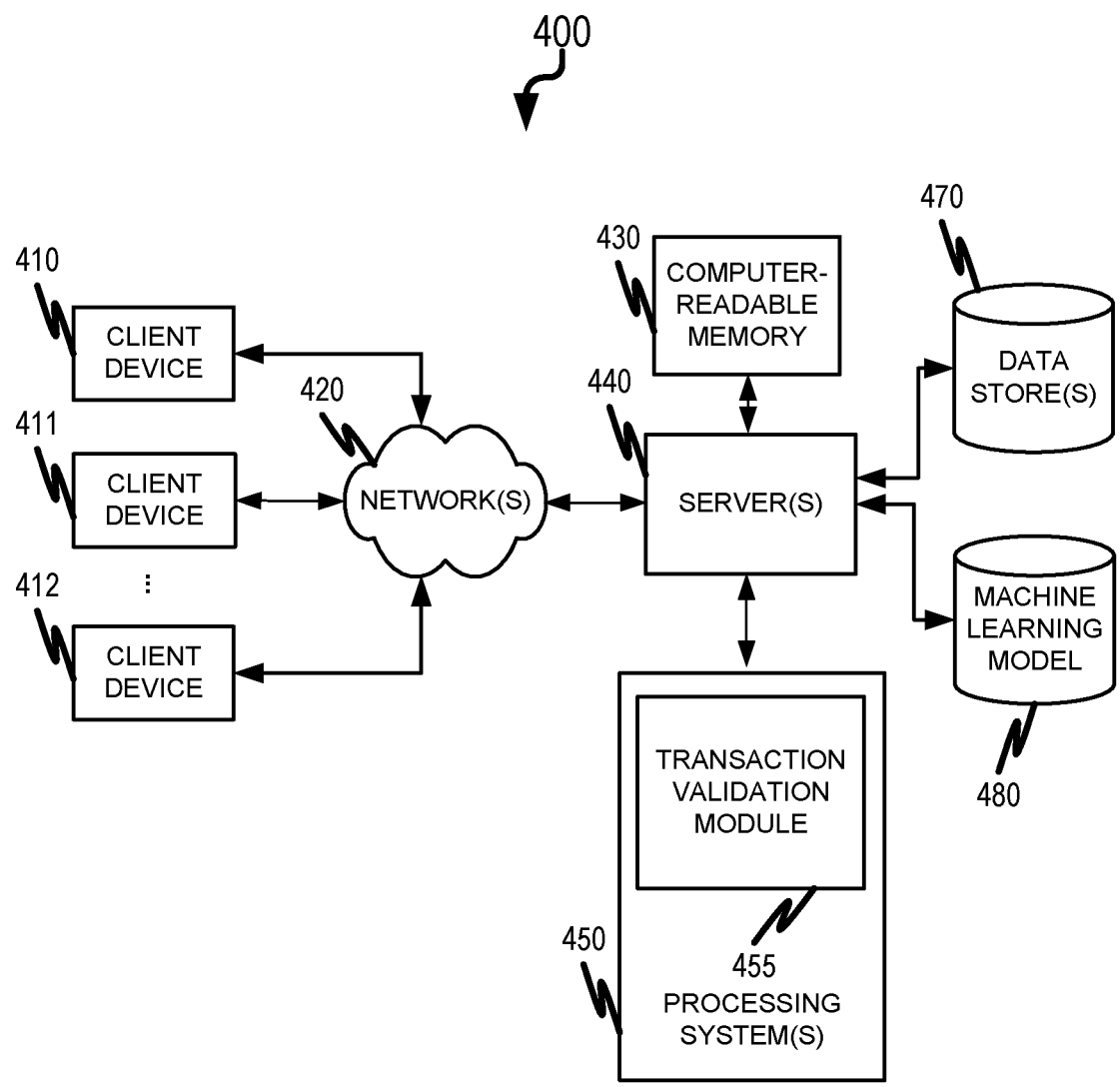
FIG. 4 is an example system architecture for use in connection with the current subject matter.

FIG. 4 illustrates the components of an exemplary system for applying machine learning to dynamically validate sales and purchase transaction data created by a user in a computing system. The system 400 may be used by a company that sells goods and services to customers, issues invoices corresponding to the sales, and submits the invoices to third parties, e.g., government entities, for review. In the system 400, one or more client devices 410, 411, and 412 can display a GUI that allows the user to create sales and purchase transaction data used by various components in the system. The one or more client devices 410, 411, and 412 can send data over one or more networks 420 to one or more servers 440. The one or more servers 440 can process the data and transmit the sales and purchase transaction data to one or more processing systems 450. The one or more processing systems 450 can access the one or more servers 440. The one or more servers 440 can access computer-readable memory 430 as well as one or more data stores 470 and a machine learning model 480. The one or more processing systems 450 include a transaction validation module 455. The transaction validation module 455 can access the machine learning model 480 and apply the model 480 to sales and purchase transaction data stored in the one or more data stores 470 to determine compliance.

Figure 5:
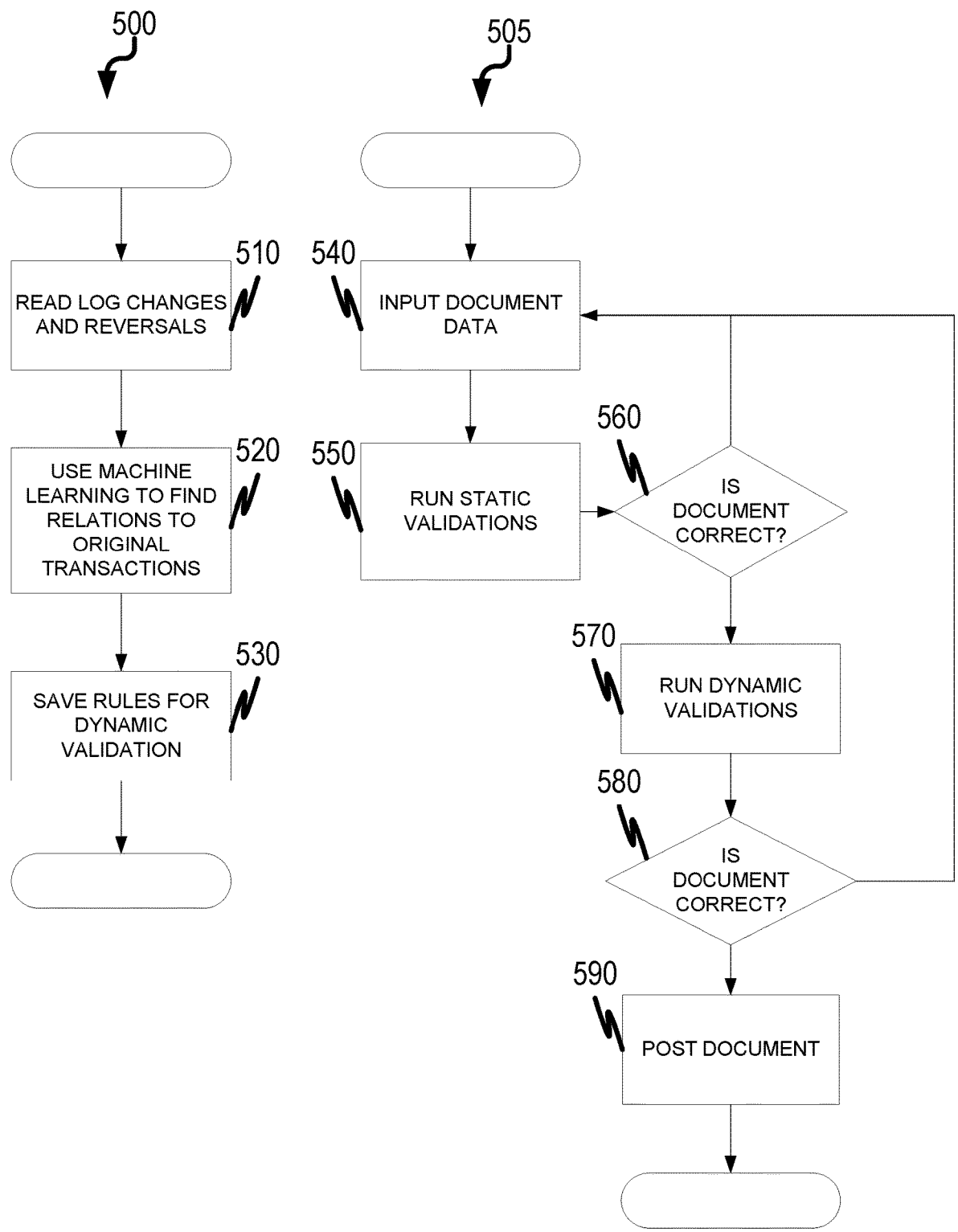
FIG. 5 illustrates steps that a system using the transaction validation module takes to validate sales and purchase transaction data created by a user in a computing system.

FIG. 5 illustrates steps that the system 400 using the transaction validation module 455 takes to validate sales and purchase transaction data created by a user in a computing system. When a company sells goods or services to a customer or purchases goods or services from a vendor, the user, typically an employee in the accounting or finance department, creates data associated with a sales and purchase transaction on a client device 410. An electronic invoice, i.e., an e-invoice, may be generated for and submitted to customers and third parties based on the sales or purchase transaction data. Before the e-invoices can be submitted, the sales or purchase transaction data is validated. The system 400 performs steps in two parallel paths, a first path 500 and a second path 505.

In the first path 500, a machine learning model is generated. The transaction validation module 455 receives original sales or purchase transaction data from the one or more data stores 450. The original sales and purchase transaction data may include changes and reversals for sales and/or purchase transactions. Additionally, the original sales and purchase transaction data may include a log that indicates changes that have been made to the sales and purchase transaction data. At 510, the transaction validation module 455 reads the changes/reversals and/or the log. At 520, machine learning is used to determine relationships between the changes/reversals and/or the log and the original sales and purchase transaction data. At 530, rules based on the determined relationships are generated and stored in the machine learning model 480. The path 500 may be executed again when more sales and purchase transaction data is available. The machine learning model 480 may be adjusted based on more sales and purchase transaction data being available.

In the second path 505, the system performs validations on current sales and purchase transaction data. At 540, a user creates sales and purchase transaction data, and the data is bundled into a "document." The document may include but is not limited to a sales order, a purchase order, an invoice, or a financial accounting document. The document is received by the transaction validation module 455 over the one or more networks 420 through one or more servers 440. At 550, static validations are performed on the document. The static validations ensure that current sales and purchase transaction data is compliant with software requirements, internal company standards, and accounting best practices and standards. The document is checked at 560 to ensure that the static validations were performed and that the document passed the static validations. At 570, dynamic validations are performed on the document. Dynamic validations use the machine learning model 480 stored at 530. The machine learning model is accessed at 570 and applied to current sales and purchase transaction data. At 580, the document is checked to ensure that the dynamic validations were performed and that the document passed the dynamic validations. If the document is correct, the system 400 may allow the user to post the document at 590. If the dynamic validations reveal a probability of compliance or a probability of accuracy based on the application of the machine learning model to the current sales and purchase transaction data, the system 400 may allow the user to modify the document.

Figure 6:
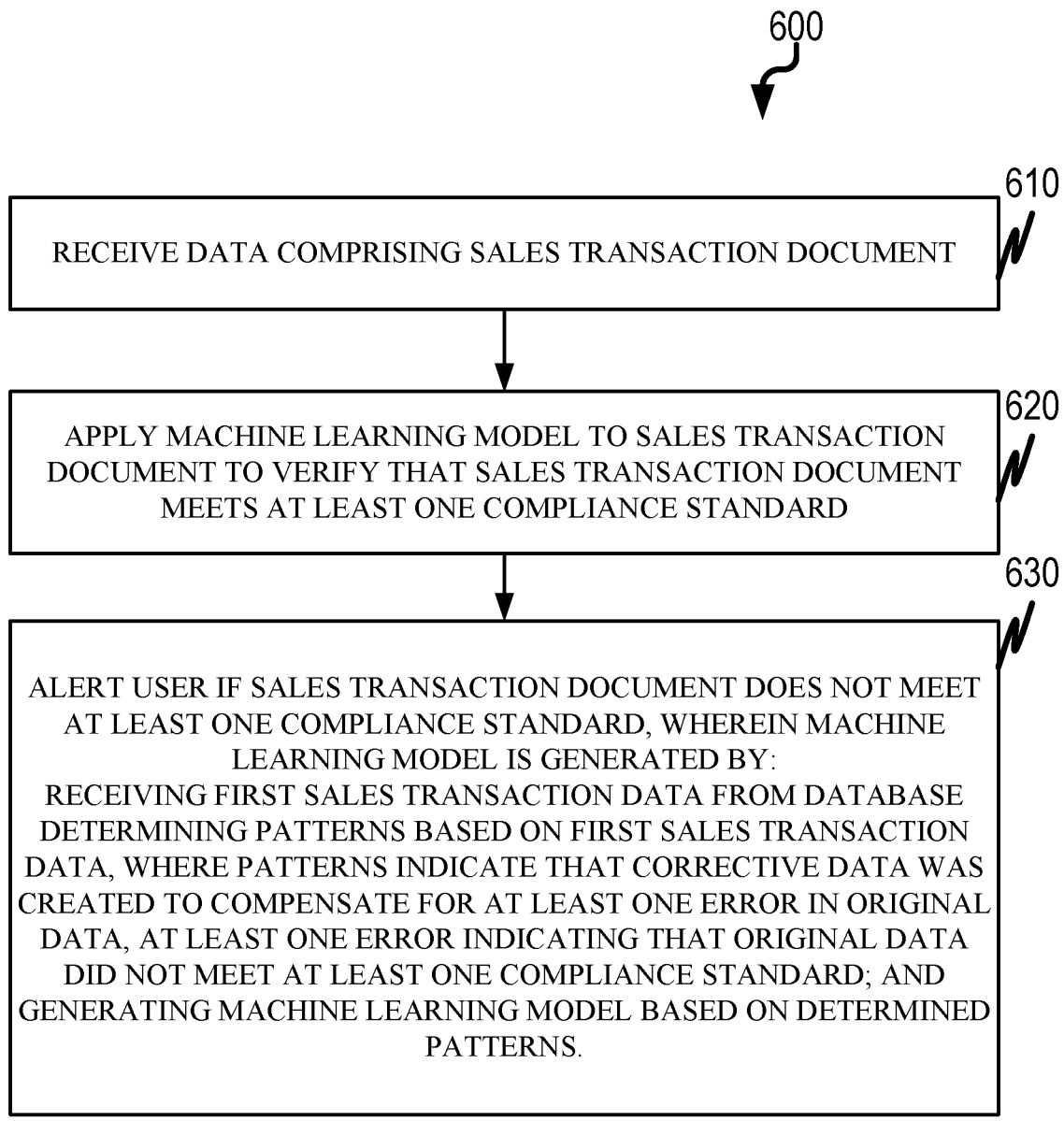
FIG. 6 is a process flow diagram illustrating techniques for applying machine learning to dynamically validate sales and purchase transaction data.

FIG. 6 is a process flow diagram 600 illustrating techniques for applying machine learning to dynamically validate a sales transaction document created by a user in a computing system. At 610, data comprising the sales and purchase transaction document is received. A machine learning model is applied to the sales transaction document to verify that the sales transaction document meets at least one compliance standard at 620. At 630, the user is alerted if the sales transaction document does not meet the at least one compliance standard. The maching learning model is generated by: receiving first sales transaction data from a database; determining patterns based on the first sales transaction data, wherein the patterns indicate that corrective data was created to compensate for at least one error in original data, the at least one error indicating that the original data did not meet at least one compliance standard; and generating the machine learning model based on the determined patterns.

One or more aspects or features of the subject matter described herein can be realized in digital electronic circuitry, integrated circuitry, application specific integrated circuits (ASICs), field programmable gate arrays (FPGAs), computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, solid-state storage devices, memory, and Programmable Logic Devices (PLDs), used to provide machine instructions and/or data to a programmable data processor, including a machine-readable medium that receives machine instructions as a computer-readable signal. The term "computer-readable signal" refers to any signal used to provide machine instructions and/or data to a programmable data processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers depending upon the situation at hand.

Figure 7:
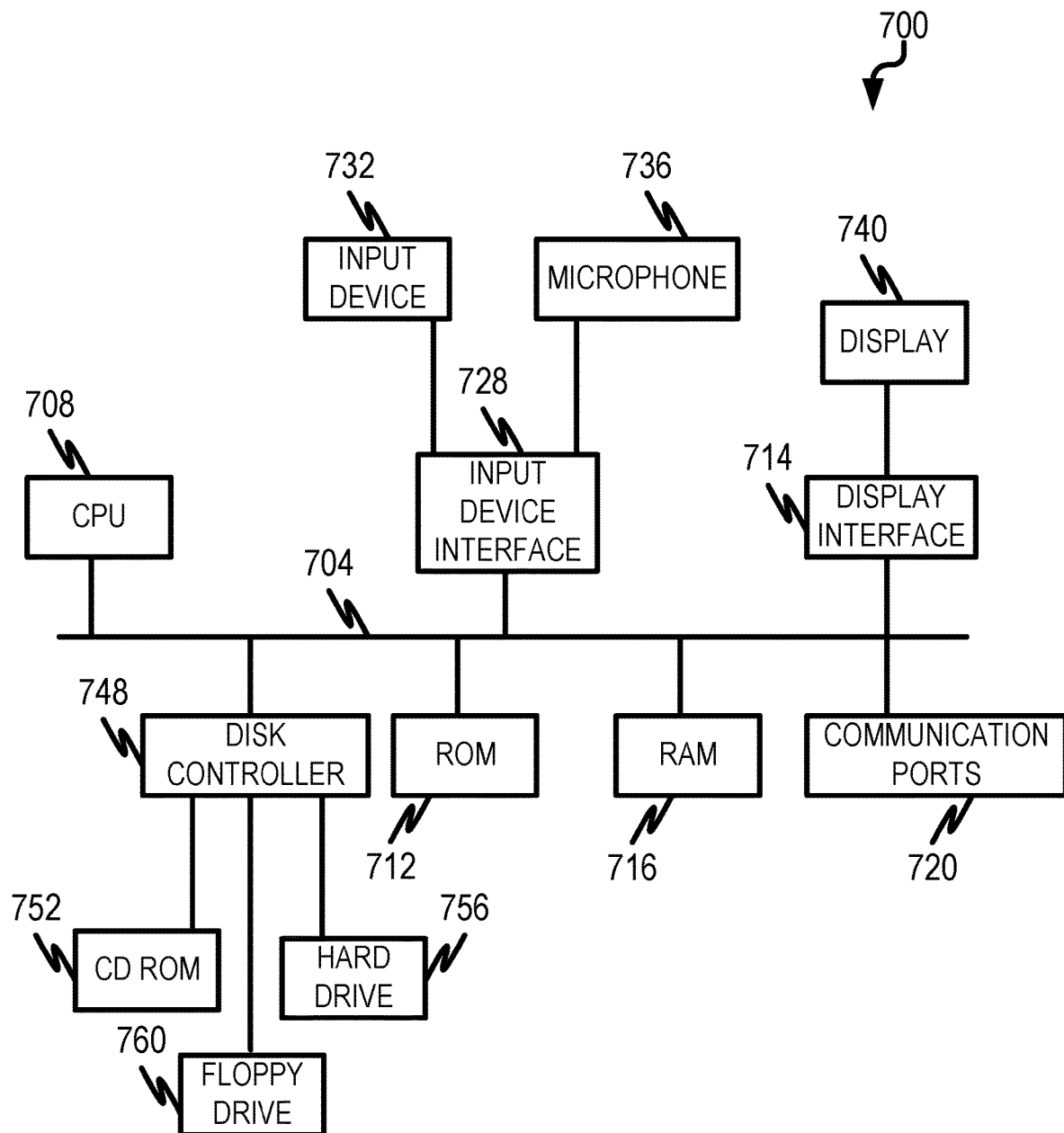
FIG. 7 is a diagram illustrating a sample computing device architecture for implementing various aspects described herein.

FIG. 7 is a diagram 700 illustrating a sample computing device architecture for implementing various aspects described herein, such as any aspect that can be processed using server(s) 440 or processing system 450 executing the transaction validation module 455. A bus 704 can serve as the information highway interconnecting the other illustrated components of the hardware. A processing system 708 labeled CPU (central processing unit) (e.g., one or more computer processors/data processors at a given computer or at multiple computers), can perform calculations and logic operations required to execute a program. A non-transitory processor-readable storage medium, such as read only memory (ROM) 712 and random access memory (RAM or buffer) 716, can be in communication with the processing system 708 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 748 can interface one or more optional disk drives to the system bus 704. These disk drives can be external or internal floppy disk drives such as 760, external or internal CD-ROM, CD-R, CD-RW or DVD, or solid state drives such as 752, or external or internal hard drives 756. As indicated previously, these various disk drives 752, 756, 760 and disk controllers are optional devices. The system bus 704 can also include at least one communication port 720 to allow for communication with external devices either physically connected to the computing system or available externally through a wired or wireless network. In some cases, the communication port 720 includes or otherwise comprises a network interface.

To provide for interaction with a user, the subject matter described herein can be implemented on a computing device having a display device 740 (e.g., a CRT (cathode ray tube) or LCD (liquid crystal display) monitor) for displaying information obtained from the bus 704 to the user and an input device 732 such as keyboard and/or a pointing device (e.g., a mouse or a trackball) and/or a touchscreen by which the user can provide input to the computer. Other kinds of input devices 732 can be used to provide for interaction with the user as well; for example, feedback provided to the user can be any form of sensory feedback (e.g., visual feedback, auditory feedback by way of a microphone 736, or tactile feedback); and input from the user can be received in any form, including acoustic, speech, or tactile input. In the input device 732 and the microphone 736 can be coupled to and convey information via the bus 704 by way of an input device interface 728. Other computing devices, such as dedicated servers, can omit one or more of the display 740 and display interface 724, the input device 732, the microphone 736, and input device interface 728.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for applying machine learning to dynamically validate a sales transaction document created by a user in a computing system, the method comprising:
   receiving data comprising the sales transaction document;
   applying a machine learning model to the sales transaction document to verify that the sales transaction document meets at least one compliance standard;
   dynamically generating, using the machine learning model, a probability of compliance with the at least one compliance standard based on first sales transaction data;
   alerting the user if the sales transaction document does not meet the at least one compliance standard;
   receiving second sales transaction data from the database; and
   adjusting the machine learning model based on the second sales transaction data,
   wherein the machine learning model is trained by:
      receiving the first sales transaction data from a database;
      training the machine learning model using the first sales transaction data;
      determining and subsequently analyzing patterns based on the first sales transaction data, wherein the patterns indicate that corrective data was created to compensate for at least one error in original data, the at least one error indicating that the original data did not meet at least one compliance standard, wherein the corrective data comprises a change to a noncompliant sales transaction document in the first sales transaction data; and
      training the machine learning model, after the training using the first sales transaction data, based on the determined patterns.

2. The computer-implemented method of claim 1, wherein the compliance standard is a tax law issued by a government entity.

3. The computer-implemented method of claim 2, wherein the at least one error indicates that an incorrect amount was paid for a tax.

4. The computer-implemented method of claim 2, wherein the at least one error indicates that a tax was not paid.

5. The computer-implemented method of claim 1, wherein the corrective data comprises a new sales transaction document that reverses a noncompliant sales transaction document in the first sales transaction data.

6. The computer-implemented method of claim 1, wherein the sales transaction document includes at least one of a purchase order and a sales order.

7. The computer-implemented method of claim 1, wherein alerting the user further comprises notifying the user of a probability that the sales transaction document does not meet the at least one compliance standard.

8. The computer implemented method of claim 1, further comprising statically validating whether the sales transaction document complies with at least one of a software requirement, an internal company standard, or an accounting standard.

9. The computer implemented method of claim 1, wherein the corrective data comprises feedback data having a plurality of noncompliant sales transactions.

10. The computer implemented method of claim 1, wherein the receiving, the applying, the dynamically generating, the alerting, and the adjusting are executed in an in-memory database.

11. A system for applying machine learning to dynamically validate a sales transaction document created by a user in a computing system, the system comprising:
one or more data processors having memory storing instructions, which when executed result in operations comprising:
receiving data comprising the sales transaction document;
applying a machine learning model to the sales transaction document to verify that the sales transaction document meets at least one compliance standard;
dynamically generating, using the machine learning model, a probability of compliance with the at least one compliance standard based on first sales transaction data;
alerting the user if the sales transaction document does not meet the at least one compliance standard;
receiving second sales transaction data from the database; and
adjusting the machine learning model based on the second sales transaction data,
wherein the machine learning model is trained by:
receiving the first sales transaction data from a database;
training the machine learning model using the first sales transaction data;
determining and subsequently analyzing patterns based on the first sales transaction data, wherein the patterns indicate that corrective data was created to compensate for at least one error in original data, the at least one error indicating that the original data did not meet at least one compliance standard, wherein the corrective data comprises a change to a noncompliant sales transaction document in the first sales transaction data; and
training the machine learning model, after the training using the first sales transaction data, based on the determined patterns.

12. The system of claim 11, wherein the compliance standard is a tax law issued by a government entity.

13. The system of claim 12, wherein the at least one error indicates that an incorrect amount was paid for a tax.

14. The system of claim 12, wherein the at least one error indicates that a tax was not paid.

15. The system of claim 11, wherein the corrective data comprises a new sales transaction document that reverses a noncompliant sales transaction document in the first sales transaction data.

16. The system of claim 11, wherein the sales transaction document includes at least one of a purchase order and a sales order.

17. The system of claim 11, wherein alerting the user further comprises notifying the user of a probability that the sales transaction document does not meet the at least one compliance standard.

18. The system of claim 11, further comprising an in-memory database.

19. A non-transitory computer readable storage medium storing one or more programs configured to be executed by one or more data processors, the one or more programs comprising instructions for applying machine learning to dynamically validate a sales transaction document created by a user in a computing system, the instructions comprising:
receiving data comprising the sales transaction document;
applying a machine learning model to the sales transaction document to verify that the sales transaction document meets at least one compliance standard;
dynamically generating, using the machine learning model, a probability of compliance with the at least one compliance standard based on first sales transaction data;
alerting the user if the sales transaction document does not meet the at least one compliance standard;
receiving second sales transaction data from the database; and
adjusting the machine learning model based on the second sales transaction data,
wherein the machine learning model is trained by:
receiving the first sales transaction data from a database;
training the machine learning model using the first sales transaction data;
determining and subsequently analyzing patterns based on the first sales transaction data, wherein the patterns indicate that corrective data was created to compensate for at least one error in original data, the at least one error indicating that the original data did not meet at least one compliance standard, wherein the corrective data comprises a change to a noncompliant sales transaction document in the first sales transaction data; and
training the machine learning model, after the training using the first sales transaction data, based on the determined patterns.

20. The non-transitory computer readable storage medium of claim 19, wherein the receiving, the applying, the dynamically generating, the alerting, and the adjusting are executed in an in-memory database.

* * * * *